Dec. 23, 1952     G. GARNIER     2,622,453
ARRANGEMENT FOR DRIVING AUXILIARY PARTS OR
APPARATUS ON BOARD AIRCRAFT
Original Filed Aug. 9, 1945     5 Sheets-Sheet 1

Inventor
G. Garnier

Inventor
G. Garnier

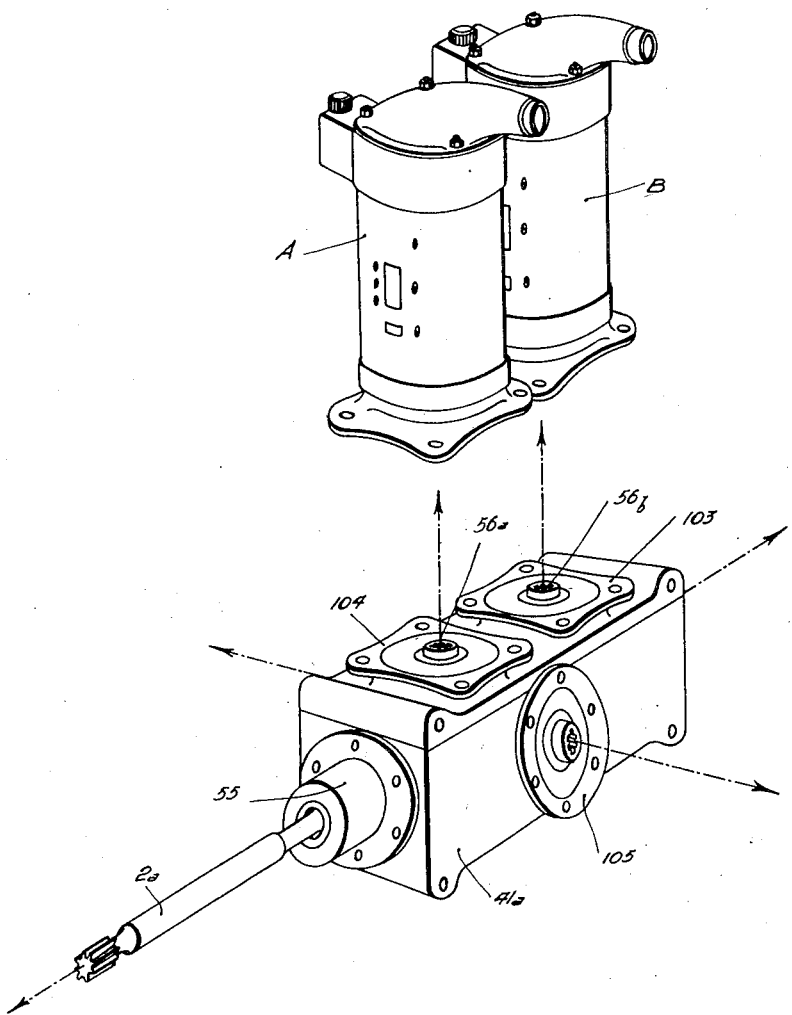

Patented Dec. 23, 1952

2,622,453

UNITED STATES PATENT OFFICE 2,622,453

ARRANGEMENT FOR DRIVING AUXILIARY PARTS OR APPARATUS ON BOARD AIRCRAFT

Georges Garnier, Paris, France, assignor to Air-Equipement, Paris, France, a French company Original application August 9, 1945, Serial No. 609,826. Divided and this application August 9, 1949, Serial No. 109,397. In France September 7, 1942

Section 1, Public Law 690, August 8, 1946
Patent expires September 7, 1962

7 Claims. (Cl. 74—665)

The present invention, which is a division of the invention described in the patent application Serial No. 609,826, filed August 9, 1945, relates to the problem of the driving of auxiliary parts or apparatuses, for instance on board of aircrafts. This driving is generally performed through the agency of gear-boxes provided with a Cardan shaft or the like device, forming part or not forming part of the gear-box, for connecting the latter with a motor and for allowing thus the gear-box and the different auxiliary parts to be driven.

It is often of advantage to drive at a distance, through the gear-box, one or more auxiliary parts when it is undesirable to position the latter on the gear-box for reasons of lubrication, vibration-transmission, bulkiness, or the like. It is also of advantage to give the gear-box different positions with reference to the axis of the motor driving it, because the available room differs from one type of aircraft to another and it is of interest for the builder and for the user, to solve the problem in all cases with the same standard gear box; it is also desirable to be capable of making use according to the number of auxiliary parts to be driven, a more or less great number of transmission means or of couplings while using a standard gear-box.

The invention has for its object to provide for gear box arrangements which may be used together or separately for ensuring the drive of auxiliary parts on board of aircrafts with the maximum ease and facility in the system, preferably through the transformation of a standard gear-box by means of interchangeable auxiliary parts adapted for use with the said gear-box.

In an embodiment of the arrangement according to the invention, the gear box which is driven at a distance from the motor driving it, comprises a main gear casing having gears therein and carrying at least one auxiliary casing secured preferably in a removable manner thereto and provided itself with at least one transmission means starting from it, provided through the surface of a joint and connected through transmission means with the mechanism of the main gear casing. It is of particular advantage for this auxiliary casing to be designed so as to cap, in place of one of the auxiliary parts, one of the transmission means starting from the main gear box, preferably any of a number or of all of said transmission means, the transmission means starting from the auxiliary casing being then adapted for coupling with the considered transmission means on the gear-box. It is thus possible to transform at will a standard gear-box so as to make it drive a number of auxiliary parts different from the standard number. An advantageous generalisation of this arrangement consists in constituting a series of interchangeable auxiliary casings all adapted to fit on the standard gear box, each of said casings being designed in a different manner or being provided with transmission means the number of which is different or which are arranged differently.

Appended drawings show by way of example several examples of embodiment of the gear-box arrangements intended to drive auxiliary parts on board of aircrafts.

In said drawings:

Fig. 3 is a diagrammatical perspective outer view of a gear-box carrying an auxiliary casing provided with a plurality of transmission means while Fig. 4 shows diagrammatically its gear work.

Figs. 5 and 6 are views which are respectively similar to Figs. 3 and 4 and show the same gear-box, but with the addition of a Cardan shaft adapted to be mounted in different positions and with two auxiliary parts intended for mounting on the auxiliary gear box.

Figs. 7, 8 and 9 are axial cross-sections of different auxiliary casings provided with a plurality of transmission means.

Figure 1:
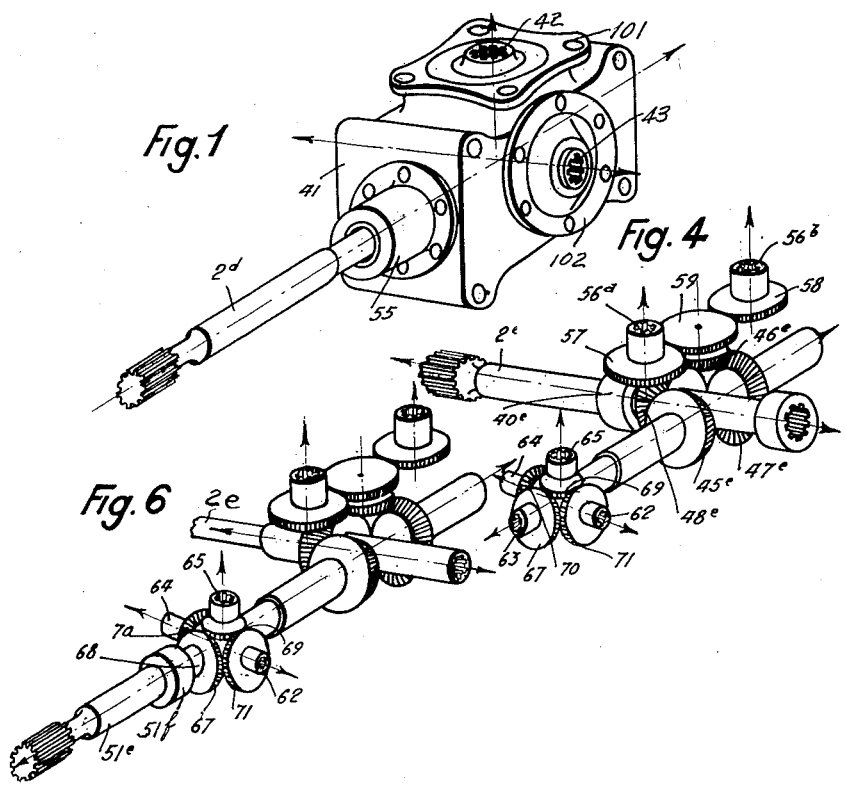
Fig. 1 is a diagrammatical perspective outer view of a gear-box the driving shaft of which may be mounted in different positions and Fig. 2 shows a modification of said gear-box with two auxiliary parts intended for mounting on the said auxiliary gear box.

In the embodiment shown in Fig. 1 the main gear box is of a known type comprising a casing 41 containing gears and transmission shaft or means arranged at 90° from one to another.

These transmission means end under the form of inwardly fluted sleeves 42, 43 opening through different faces of the box at the center of bearing surfaces 101, 102 to which are secured the auxiliary parts to be driven.

In front of the main casing 41 is mounted an auxiliary casing 55 containing a knee-joint for coupling the gears of the main box 41 with a driving shaft 2d and a stub-shaft provided with a fluted end-piece for connecting said knee-joint with the transmission means of the gear-box.

It is then possible to mount this shaft 2d on any of the transmission means of the casing 41.

Figure 3:
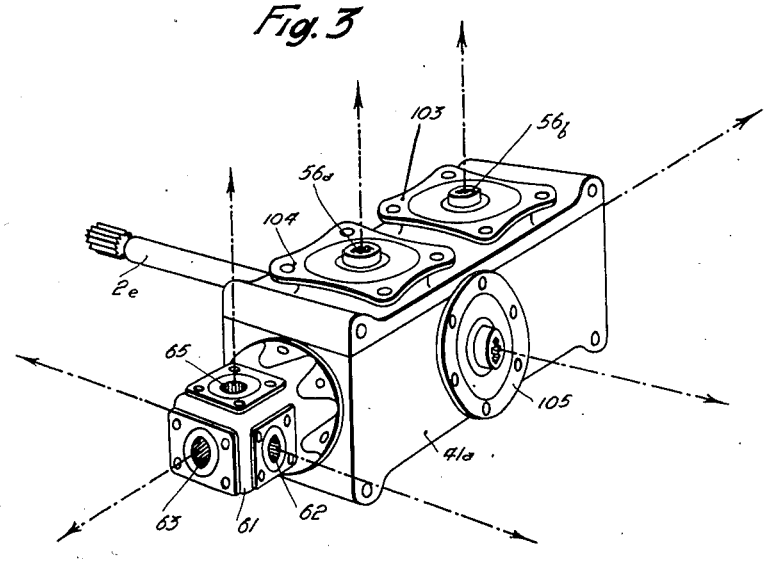

In the embodiment shown in Figs. 3 and 4 the main gear box 41a with bearing surfaces 103, 104, 105 is provided with two transmission means located side by side, 56a and 56b, driven respectively by the toothed wheels 57, 59, said toothed wheels mesh with a common pinion 59 keyed to the spindle of the bevel pinion 46e which is one of three bevel pinions 45e, 46e, 47e meshing with a common pinion 48e rigidly secured to the Cardan joint 40e for the driving shaft 2e.

Figure 2:
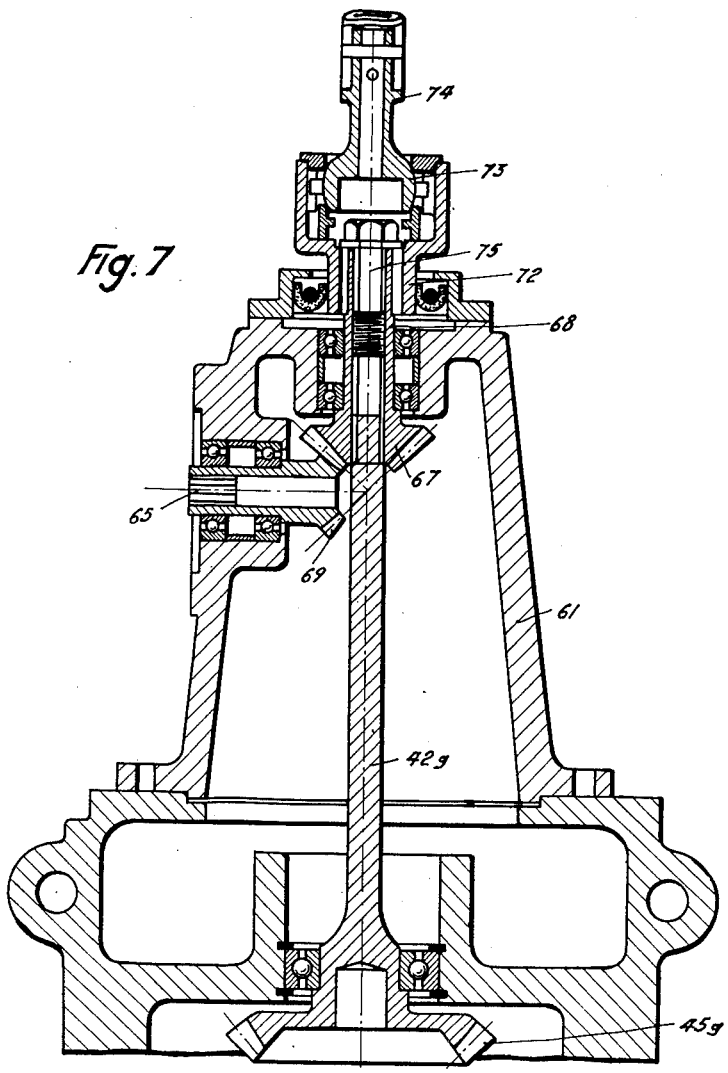

The modification shown in Fig. 2, in which are shown two auxiliary parts A and B intended for mounting on two bearing surfaces of the casing 41a in order to be driven from the transmission means 56a and 56b, differs from that just described only through the arrangement of the driving shaft 2d which is similar to that described with reference to Fig. 1.

It is possible to replace any transmission means through an auxiliary casing 61 comprising in its turn a plurality of transmission means 62, 63, 64 and 65 as illustrated in Figs. 3, 4, 5 and 6 in the case of a gear box comprising several transmission means located side by side, but auxiliary casings such as casing 61 may also be provided on a standard casing in lieu of as many simple transmission means. Such a casing 61 is preferably interchangeable with the casing 55 of Fig. 2.

Figure 5:
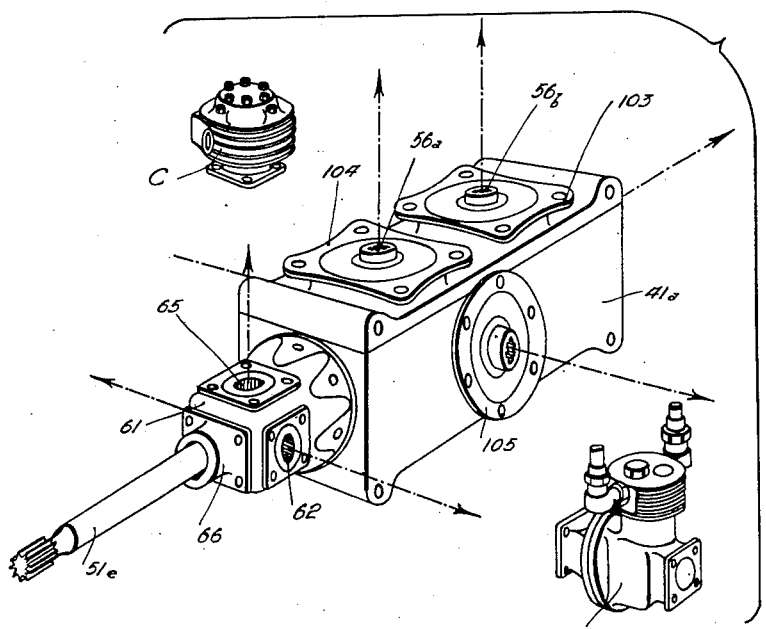

Figs. 5 and 6 (wherein the gear members already described with reference to the Figs. 3 and 4 are indicated with the same reference numerals) show, on the one hand, two auxiliary parts C and D which may be mounted on the auxiliary gear box 61 and, on the other hand, the adjunction to the system illustrated in Figs. 3 and 4 of a shaft 51e with a Cardan joint 51f for driving an auxiliary part distant from the gear box. Said shaft is carried by a small casing 66 removably secured to the casing 61 in front of one of its transmission means 63 inside which is fitted a fluted stubshaft integral with the Cardan joint 51f in shaft 51e.

The casing 61 may form an integral part of the gear-box as shown in Fig. 7 where the spindle 42g of the pinion 45g passes through the casing 61 and ends under the form of a fluted part over which is fitted a bevel pinion 67 having width teeth and of which the long hollow spindle 68 is partly tapped and projects outside the casing 61. The bevel pinion 67 inside the casing 61 meshes with bevel pinions 69, 70, 71 integral respectively with corresponding fluted sleeves forming transmission means at 62, 64 and 65 for spindles distributed at 90° with reference to one another in a common plane perpendicular to the spindle 42g.

The outwardly projecting, fluted portion of the spindle 68 forms transmission means. In the example of Fig. 7, a sleeve 72 forms a cup-shaped bearing for the knee-joint 73 of a shaft 74 and is fitted over said fluted part. It is held fast by means of a screw 75 screwed into the tapped part of this spindle 68.

Figure 8:
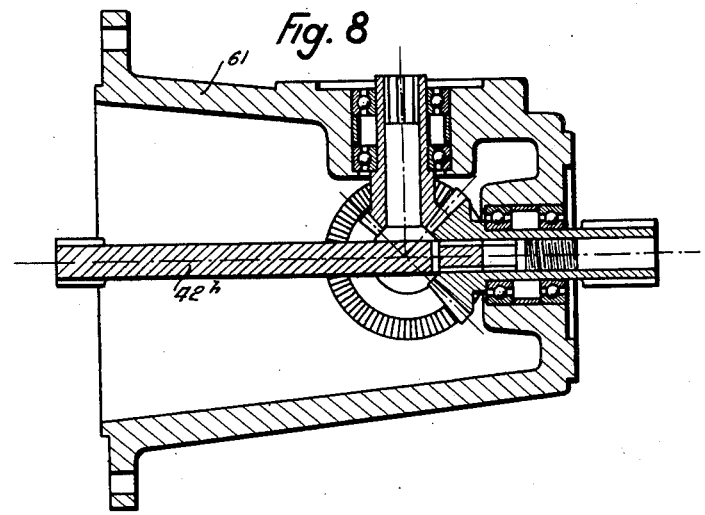
Figure 9:
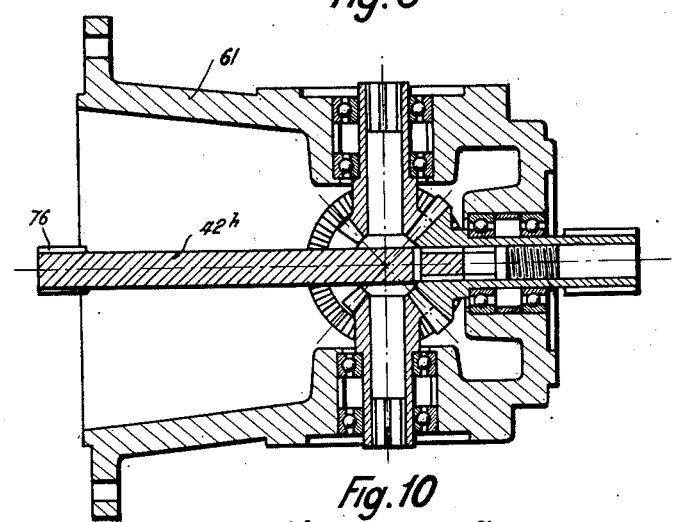

In Figs. 8 and 9, the auxiliary casing 61 is designed in the same manner as in Fig. 7 with the difference that the driving shaft 42h for the different transmission means of the casing is not longitudinally rigid with the gear wheel which drives it and which forms part of the principal casing, but is provided with flutings 76 which engage the transmission means on the standard casing which is to receive the auxiliary casing. The latter thus designed is therefore capable of being immediately fitted over said transmission means and eventually over any one of a number of such transmission means on a standard casing, if some or all of the transmission means on the latter are identical with one another.

Whatever may be the design of the other parts of the auxiliary casing, its pinions are arranged as shown in Figs. 8 and 9 if it is desired to provide for a casing comprising at least two transmission means at 90° from one another and driven through couples of gears; they are provided with a common driving pinion 67 carrying elongated teeth whereas the pinions 69 and 71 (or 69, 69a and 71) of the adjacent transmission means are of different diameters and carry short teeth meshing with different portions of the elongated teeth of the common pinion 67.

Figure 10:
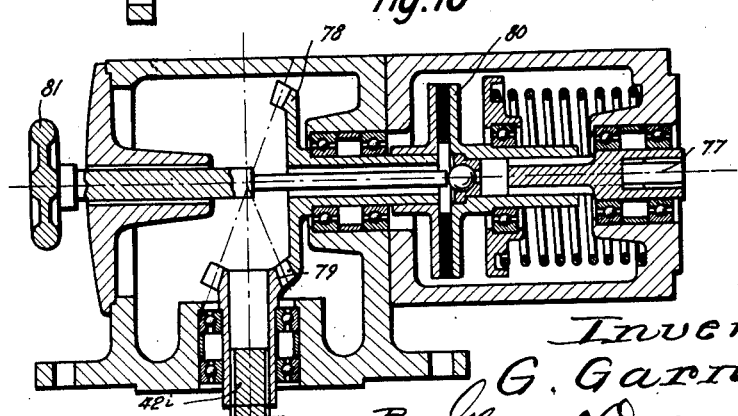
Fig. 10 is an axial cross-section of an auxiliary casing provided with clutching means.

In the embodiment of the auxiliary casing 61a shown in Fig. 10, the transmission means 77 perpendicular to the driving shaft 42i is connected with its driving pinion 78, meshing with a pinion 79 fitted over the shaft 42i, through the agency of a friction clutch 80 controlled from outside through the handwheel 81.

Of course the invention is by no means limited to the details of execution shown or described which have been given out solely by way of example.

What I claim is:

1. A gear-box arrangement comprising a casing including outer faces, bearing surfaces provided on several outer faces of said casing for receiving cooperating surfaces of corresponding auxiliary parts to be driven by said arrangement, two of said bearing surfaces being provided side by side on one of said casing faces, a driving shaft having on its two ends disconnectable coupling means that open on to two opposite bearing surfaces, a driving bevel pinion secured on said driving shaft, three bevel driven pinions in mesh with the driving pinion and having their axes converging at right angles with respect to each other and to the said driving shaft and including two opposite driven pinions, two coaxial driven shafts whereon are secured said two opposite driven pinions, said driven shafts having on their outer ends disconnectable coupling means that open on to two opposite bearing surfaces, a toothed wheel forming one piece with the third driven pinion, two toothed wheels in mesh with the first named toothed wheel, and two disconnectable coupling means forming one piece with the last named toothed wheels and arranged so as to open on to the two bearing surfaces located side by side on the same casing face.

2. A gear box arrangement as defined in and by claim 1 and further including an auxiliary casing removably secured to another outer face of said first mentioned casing, a driving bevel pinion within said auxiliary casing, means operably coupling the same to one of said driven shafts in said first casing, at least two driven bevel pinions within said auxiliary casing in mesh with the driving bevel pinion therein and having their axes disposed at right angles with each other and with the axis of the driving bevel pinion, said last mentioned pinion having elongated teeth and said driven bevel pinions in the auxiliary casing being in mesh with said teeth on two different diameters thereof so that the driving and driven pinions in the auxiliary casing have the same speed, and means for removably coupling said last mentioned driven pinions with auxiliaries to be driven.

3. A compact arrangement for driving from a prime mover, auxiliary parts on board aircraft comprising the combination of a main gear box including a casing and fixed speed gears therein with an auxiliary gear box removably secured to said main gear box, the casing of said main gear box having bearing surfaces thereon for receiving cooperating bearing surfaces of some of said auxiliaries to be driven, disconnectable coupling elements identical to each other, with their axes at right angles with respect to each other for driving auxiliaries from the gears within the casing through corresponding bearing surfaces, said auxiliary gear box including a casing and means for removably securing the same to any one of the bearing surfaces of the main gear box, said auxiliary gear box casing having fixed speed gears therein and disconnectable coupling elements for driving some others of the auxiliary parts and coupling means for positively connecting the gears of the auxiliary gear box to one of the coupling elements of the main gear box.

4. The combination as claimed in claim 3, wherein the gears of the auxiliary gear box comprise at least one driving bevel pinion driven from one of the coupling elements of the gears of the main gear box and at least two driven bevel pinions in mesh with said driving pinion and having their axes at right angles with each other and with the axis of the driving pinion.

5. A combination as claimed in claim 4, wherein the driving pinion has elongated teeth, the driven pinions being in mesh with said driving pinion on two different diameters of said pinion so that the driving and driven pinions may run at equal speed.

6. The combination as claimed in claim 3, wherein the casing of the auxiliary gear box is provided with bearing surfaces for receiving cooperating surfaces of some auxiliary parts, the disconnectable coupling elements of the gears enclosed in said casing being identical to each other and passing through said bearing surfaces for driving said auxiliary parts.

7. A combination as claimed in claim 3, further comprising at least one shaft entering said auxiliary gear box and operatively connected to one of the disconnectable coupling elements thereof, and coupling means on said shaft for driving an auxiliary part spaced with relation to and separate from said auxiliary gear box.

GEORGES GARNIER.

REFERENCES CITED

The following references are of record in the file of this patent:

UNITED STATES PATENTS

| Number | Name | Date |
| --- | --- | --- |
| 2,287,279 | Stumpf | June 23, 1942 |
| 2,289,396 | Waseige | July 14, 1942 |
| 2,454,293 | Waseige | Nov. 23, 1948 |

FOREIGN PATENTS

| Number | Country | Date |
| --- | --- | --- |
| 473,229 | Great Britain | Oct. 8, 1937 |